United States Patent [19]

Chodzko et al.

[11] 4,126,381
[45] Nov. 21, 1978

[54] CONVERGING WAVE UNSTABLE RESONATOR

[75] Inventors: Richard A. Chodzko, Rancho Palos Verdes; Stephen B. Mason, Woodland Hills, both of Calif.

[73] Assignee: The United States of America as represented by the Secretary of the Air Force, Washington, D.C.

[21] Appl. No.: 809,730

[22] Filed: Jun. 24, 1977

[51] Int. Cl.$^2$ ............................................. H01S 3/081
[52] U.S. Cl. ............................... 350/294; 331/94.5 C; 350/299
[58] Field of Search .................... 331/94.5 C, 94.5 D; 350/294, 299

[56] References Cited

U.S. PATENT DOCUMENTS

| 3,824,487 | 7/1974 | Buczek et al. | 331/94.5 C |
| 3,909,744 | 9/1975 | Wisner et al. | 331/94.5 C |

*Primary Examiner*—William L. Sikes
*Attorney, Agent, or Firm*—Joseph E. Rusz; Robert Kern Durican

[57] ABSTRACT

An unstable resonator is disclosed that couples power out of an annular gain region in a single transverse mode through the use of spherical mirrors. A four-element cavity comprising a confocal unstable resonator with a double-sided 45° output coupling mirror in conjunction with a flat feedback mirror is used. A flat, totally reflecting feedback mirror is placed on the normally plane wave output side of the confocal cavity, forming an annular mode between the feedback mirror and the coupling mirror. A plane annular wave is fed back into the resonator, which alternately converges and diverges to produce an output beam in the form of a diverging annular beam. The converging wave unstable cavity has the novel property whereby increasing geometric magnification corresponds to increasing saturation of the active medium, in contrast to a conventional edge-coupled unstable cavity.

2 Claims, 12 Drawing Figures

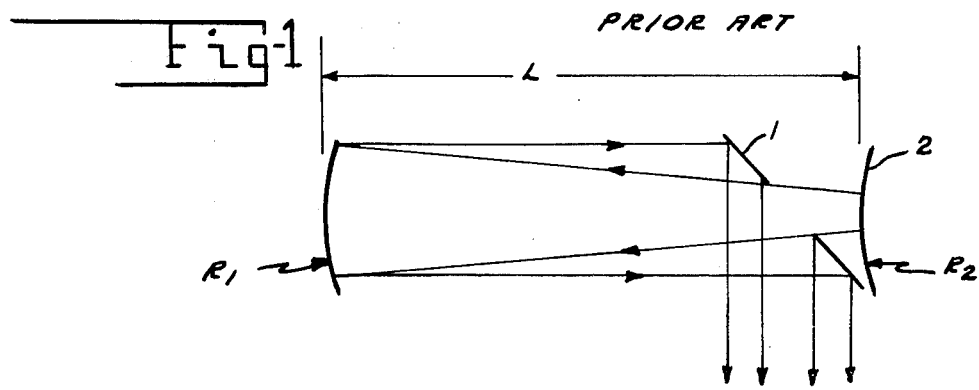
Fig-1 PRIOR ART
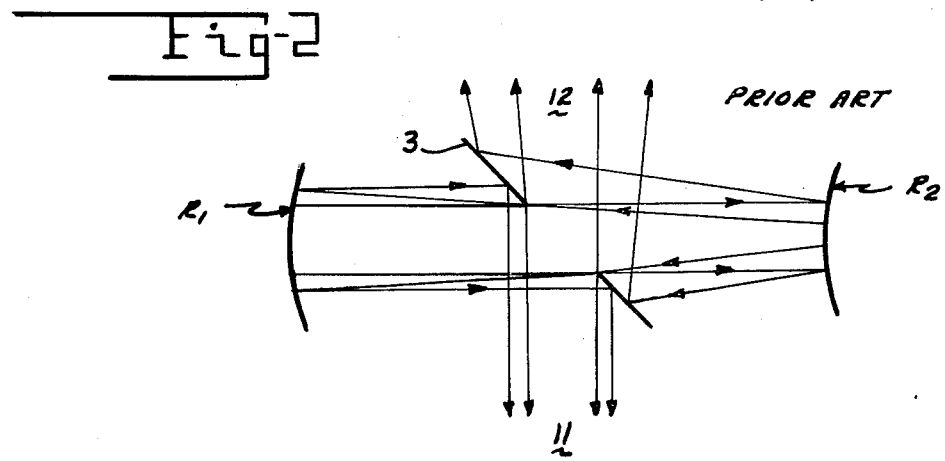
Fig-2 PRIOR ART
Fig-3
DIVERGING SPHERICAL WAVE OUTPUT BEAM
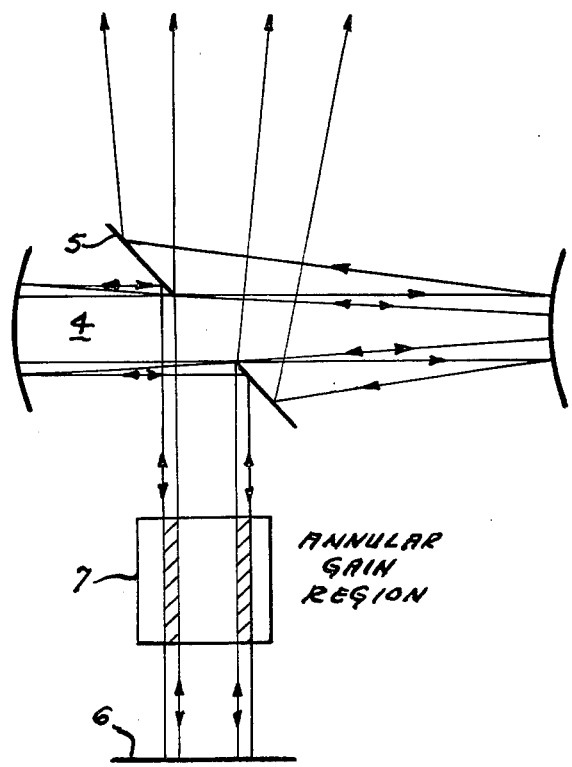
ANNULAR GAIN REGION

CONVERGING WAVE UNSTABLE RESONATOR

RIGHTS OF THE GOVERNMENT

The invention described herein may be manufactured and used by or for the Government of the United States for all governmental purposes without the payment of any royalty.

BACKGROUND OF THE INVENTION

The field of the invention is in electromagnetic wave generating devices and more particularly in the cavity resonator art of laser devices.

Unstable resonators as well as confocal unstable resonators are well known in the laser art. Typical examples of prior art devices are contained in U.S. Pat. Nos. 3,921,096 to patentees Chenausky et al. and 3,969,685 to patentees Chenausky et al.

SUMMARY OF THE INVENTION

A novel unstable cavity resonator is disclosed that extracts coherent power from an arbitrary annular, cylindrical active volume. The cavity, which uses conventional spherical mirrors, obtains mode control by initially generating a converging spherical wave in the equivalent lens sequence and subsequently generating a diverging spherical wave that provides the output beam. This device has therefore been termed a "converging wave unstable resonator." A theory valid in the geometric optics limitation is presented to further describe the invention and data taken from an operating embodiment of a converging wave unstable cavity with a CW HF laser is given to further aid in the practicing of the invention. The invention differs primarily from a conventional confocal unstable cavity in that the mode is formed by a standard confocal unstable cavity placed outside of the active region. Feedback through the annular active region is provided by a double-sided 45° coupling mirror and a flat feedback mirror.

BRIEF DESCRIPTION OF THE DRAWING

FIG. 1 is a schematic diagram of a prior art confocal unstable cavity configuration having single-ended output;

FIG. 2 is a schematic diagram of a prior art confocal unstable cavity configuration having double-ended output;

FIG. 3 is a schematic diagram of a typical converging wave unstable cavity with external feedback embodiment of the invention;

DESCRIPTION OF THE PREFERRED EMBODIMENT

Figure 4:
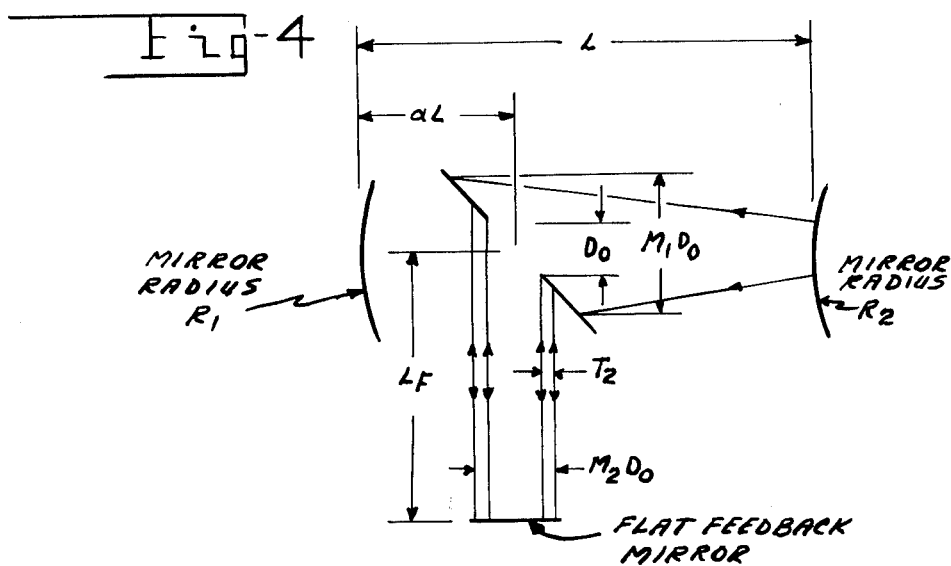
FIG. 4 is a schematic diagram of an embodiment with geometric parameters.

FIG. 1 is a schematic diagram of a conventional, prior art, positive branch confocal unstable resonator. It shows the standard single-ended output technique where the 45° output coupling mirror 1 is placed close to the convex mirror 2. Most (but not all) of the output radiation is extracted from the coupling mirror surface facing the concave mirror since most of the geometric expansion occurs on this side. Also, as illustrated in FIG. 2, a double-ended output by the use of a double-sided, 45° output coupling mirror 3 is known. For a confocal unstable resonator, the two output beams consist of a parallel beam 11 and a diverging spherical wave 12 with their relative magnifications dependent on the axial position of the coupling mirror. In FIGS. 1 and 2, the active region is assumed to be inside the resonator, and the output beams are formed as the result of the geometric expansion of diverging spherical waves.

FIG. 3 shows schematically a typical converging wave confocal unstable resonator with external feedback. The four-element cavity consists of a confocal unstable resonator 4 with a double-sided output coupling mirror 5 in conjunction with a flat, totally reflecting feedback mirror 6. The feedback mirror 6 is placed on the plane wave "output" side of the double-ended unstable resonator, thus forming an annular mode within the geometric optics approximation. When a conventional gain medium 7 is placed between the output coupling mirror 5 and the flat feedback mirror 6 the resonator will extract power from an annular portion of the active region, thus with the active region 7 annular in shape, the resonator will efficiently extract power from the medium. It should be noted that, if the shape of the hole in the output coupling mirror 5 is varied, a variety of annular cylindrical modes can be generated, which include a circular or a square annulus.

FIG. 4 shows the various geometric parameters to be considered in the design of the converging wave unstable cavity. These parameters include the mirror radii $R_1$ and $R_2$, the mirror separation L, the distance between the concave mirror and the coupling mirror $\alpha L$, the diverging wave magnification of the output beam $M_1$, the plane wave magnification $M_2$, the diameter of the hole in the output coupling mirror $D_0$, the distance between the feedback mirror and the coupling mirror $L_F$, and the thickness of the feedback annulus $T_2$. Another parameter not shown in FIG. 4 is the confocal cavity magnification M.

Figure 5:
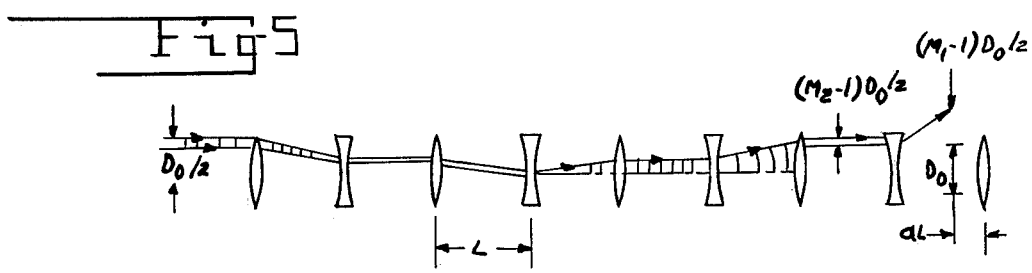
FIG. 5 is a schematic drawing illustrating an equivalent lens sequence for a converging wave unstable cavity.

FIG. 5 is a schematic of the equivalent lens sequence for the converging wave unstable cavity that illustrates the principle of operation within the geometric optics approximation. Thus, a plane annular wave is launched into the sequence from the active medium. The converging wave is reduced in size down to the diffraction-limited spot size of the order $\sqrt{\lambda L}$ and subsequently expanded such that a fraction of the incident wave (of diameter $M_2 D_0$) is reflected back into the gain region to provide feedback and a fraction (of diameter $M_1D_0$) is output-coupled in the form of a diverging spherical wave. Since the converging wave is limited by a diffraction in this device, any nonuniformities in intensity caused by variations in the gain distribution will be smoothed out to provide an output beam in the form of an annulus with a more uniform intensity distribution.

The positive branch confocal unstable cavity shown in FIG. 1 will have a round-trip magnification M given by:

$$M = \frac{R_1}{R_2} \quad (1)$$

and the radii of curvature of the mirrors are related by $$R_1 + R_2 = 2L \quad (2)$$

It can be shown from FIG. 5 that the diverging wave magnification $M_1$ is given by:

$$M_1 = M - \alpha(M - 1) \quad (3)$$

within the geometric optics limit. The plane wave magnification $M_2$ is given by:

$$M_1 M_2 = M \quad (4)$$

Figure 6:
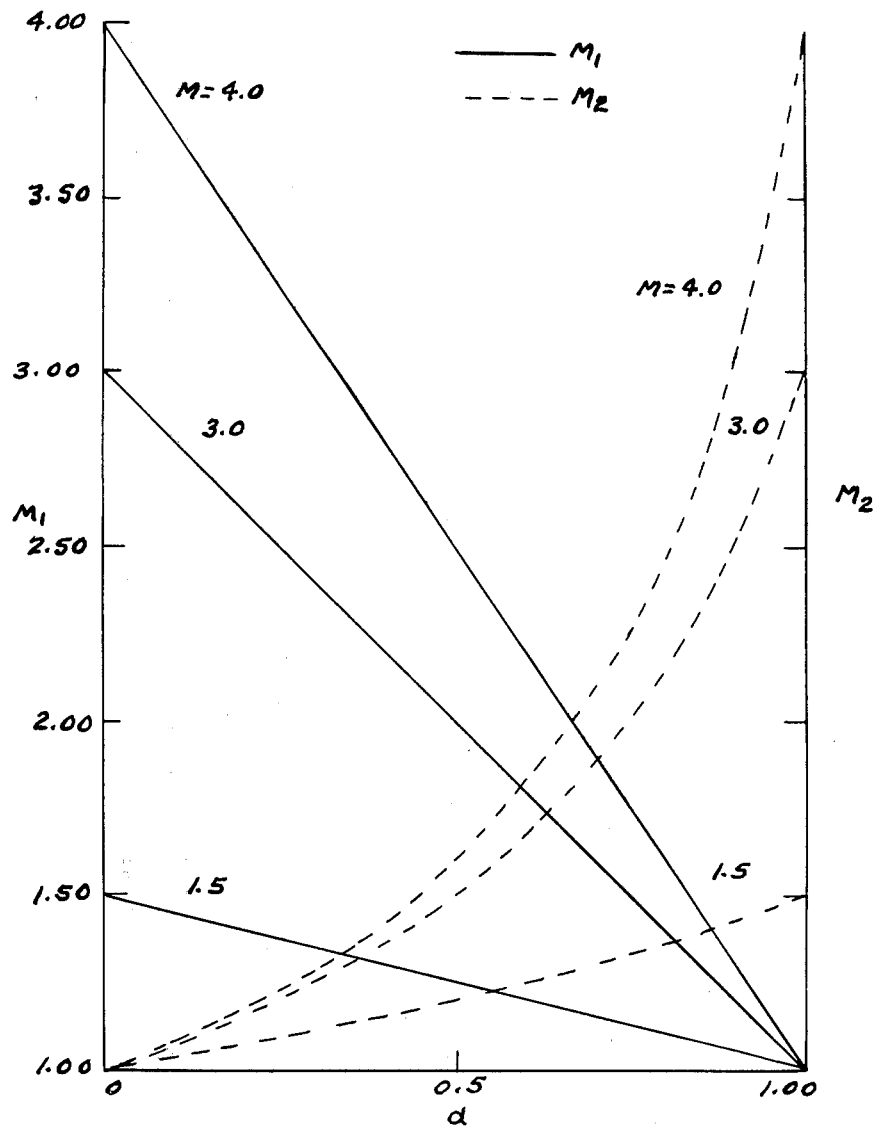
FIG. 6 is a plot showing the typical variations of plane wave ($M_2$) and diverging wave ($M_1$) magnification with position of coupling mirror ($\alpha$)

FIG. 6 shows a plot of $M_1$ and $M_2$ versus $\alpha$ for various values of M from (3) and (4). Thus, if the output coupling mirror is positioned at various locations, the relative values of $M_1$ and $M_2$ can be varied over a wide range, from $M_1 = M$ and $M_2 = 1$ to $M_1 = 1$ and $M_2 = M$. These limiting values will not be attainable, of course ($\alpha = 0$ and $\alpha = 1$), because of the finite size of the coupling mirror. In the configuration shown in FIG. 4, the plane wave magnification $M_2$ corresponds to the feedback through the active medium. For a given device, the annular gain region will be specified and, hence, $M_2$ will be specified. Thus, for a given value of M, $M_1$ and $\alpha$ will then be determined. Equations (3) and (4) also show that $M_1$ is linearly proportional to M for a fixed value of $\alpha$, while $M_2$ approaches a finite limit of $$M_2 = \frac{1}{1 - \alpha} \quad (5)$$

as $M \to \infty$, which is a result of the assumed confocal unstable cavity geometry.

Figure 7:
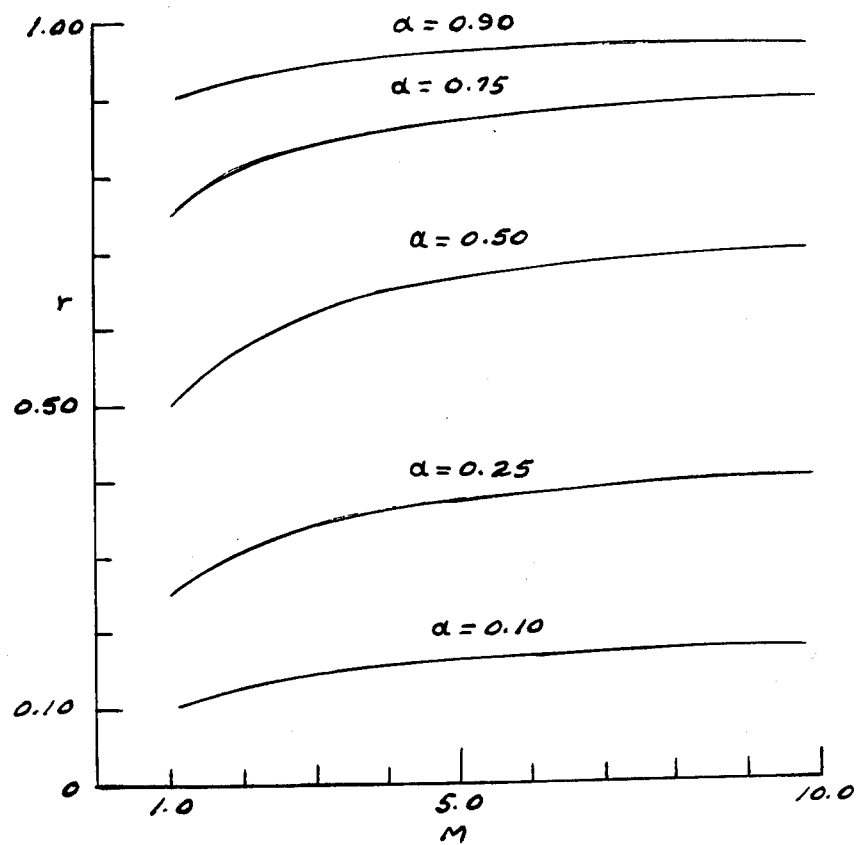
FIG. 7 is a graphical plot showing the typical variation of reflectivity ($r$) with confocal unstable cavity magnification (M) for various coupling mirror locations ($\alpha$)

Another parameter of interest for the converging wave confocal unstable resonator in FIG. 3 is the reflectivity $r$ and the transmissivity $t$ of the device. It is clear that these properties will differ from a conventional unstable resonator since what is normally output-coupled is now being fed back into the resonator. In FIG. 5, it can be seen that an annular input from the active region will first converge and then expand from the diffraction-limited spot size. A fraction $$r_1 = 1 - \frac{1}{M_2^2} \quad (6)$$

will then be fed back, and a fraction $$t_1 = \frac{M_1^2 - 1}{M^2} = \frac{1}{M_2^2} - \frac{1}{M^2} \quad (7)$$

will be output-coupled in the form of a diverging spherical wave within the geometric optics approximation. Subsequently, more plane waves will be fed back into the active region and more spherical waves will be output-coupled until all of the energy from the incident annular plane wave is either reflected or transmitted. Thus, for the nth wave, a fraction $$r_n = \left(1 - \frac{1}{M_2^2}\right)\left(\frac{1}{M^2}\right)^{n-1} \quad (8)$$

is reflected, and a fraction $$t_n = \left(\frac{1}{M_2^2} - \frac{1}{M^2}\right)\left(\frac{1}{m^2}\right)^{n-1} \quad (9)$$

is transmitted. The total reflectivity $r$ and transmissivity $t$ are given by $$r + \sum_{n=1}^{\infty} r_n = \left(1 - \frac{1}{M_2^2}\right) \sum_{n=1}^{\infty} \left(\frac{1}{M^2}\right)^{n-1} = \frac{(1 - 1/M_2^2)}{(1 - 1/M^2)} \quad (10)$$

and $$t = \sum_{n=1}^{\infty} t_n \left(\frac{1}{M_2^2} - \frac{1}{M^2}\right) \sum_{n=1}^{\infty} \left(\frac{1}{M^2}\right)^{n-1} = \frac{(1/M_2^2 - 1/M^2)}{(1 - 1/M^2)} \quad (11)$$

where it is assumed that $M > 1$. Note from (10) and (12) that $r + t = 1$. In FIG. 7 the reflectivity $r$ is plotted as a function of magnification M for various values of $\alpha$. Thus, as M varies from 1 to $\infty$ for a fixed value of $\alpha$, $r$ varies from $\alpha$ to $1-(1-\alpha)^2$. The value of $r = \alpha$ in the limit of $M = 1$ is not valid, however, since the series indicated in (10) and (11) do not converge.

Figure 8:
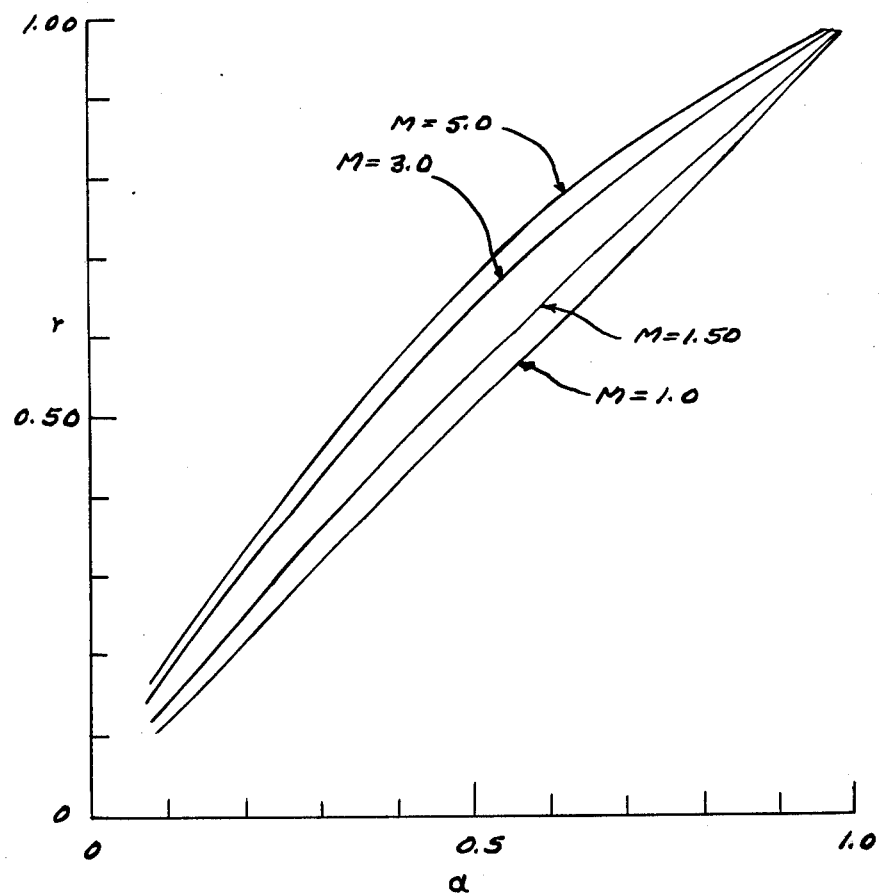
FIG. 8 is a plot showing typical variation of reflectivity ($r$) with coupling mirror position ($\alpha$) for various values of magnification (M)

It can be concluded from FIG. 7 that the reflectivity $r$ increases with increasing M in contrast to the conventional unstable resonator. The variation of $r$ with M is not large, however, with a maximum variation of 50% for $\alpha = 0.5$. It is also seen that, if the 45° coupling mirror is suitably positioned, a wide range of values for the reflectivity can be obtained to satisfy the threshold condition for the given active medium. The primary parameter that controls the reflectivity $r$ is seen to be $\alpha$ as shown in FIG. 8. Thus, for small values of M (near unity), the reflectivity is nearly linearly dependent on $\alpha$.

The converging wave confocal unstable resonator (see FIGS. 3 and 5) differs from the conventional unstable resonator in that there occur many passes within the empty resonator before the return (reflected) wave traverses the active medium. Within the geometric optics approximation, the number of round-trip passes $N_p$ is given by (assuming $D_F = D_i M^{N_P}$)

$$N_p = \frac{\ln(D_F/D_i)}{\ln(M)} \quad (12)$$

where $D_F$ is the maximum beam diameter in the cavity and $D_i$ is the initial beam diameter ($D_i \approx \sqrt{\lambda L}$, based on diffraction). Thus, $2N_p$ round trips are required to get in and out of the sequence shown in FIG. 5 for the first geometric wave ($r_1$ and $t_1$) and one more for each subsequent wave ($r_2, r_3 \ldots r_n$). This implies more reflection losses for the converging wave cavity and more sensitivity to cavity mirror aberrations than for the conventional edge-coupled unstable cavity. From (8), (9), and (12), it can be seen that these additional losses can be reduced by increasing the magnification M. Thus, if the magnification M is increased $\simeq 3.0$, most of the energy will be contained in the first geometric wave ($R_1 + t_1 \simeq 0.9$). If $D_F \simeq 2.5$ cm and $D_i \simeq 1.25$ mm, then $N_p \simeq 3$ round trips (assuming $L = 1$ m and $\lambda = 3 \times 10^{-4}$ cm).

The above analysis is valid within the geometric optics approximation. It is of interest to determine the conditions when diffraction effects will become important for the converging wave unstable cavity shown in FIG. 5. One condition is that the annular mode in the feedback region ($M_2$) must remain a nearly geometric annulus in one round trip from the coupling mirror and back over the distance $2L_F$. The two characteristic lengths defining the feedback mode are the hole diameter in the coupling mirror $D_0$ and the thickness of the annulus $T_2$. Normally, $D_0 > T_2$, so that the geometric optics approximation will be valid if $$L_D = \frac{T_2^2}{\lambda} > 2L_F \quad (13)$$

where $L_D$ is a characteristic distance over which the thickness of the annulus will not spread appreciably from its geometric value. Thus, it can be implied from (13) that $$\frac{L_D}{2L_F} = \frac{T_2^2}{2\lambda L_F} = (M_2 - 1)^2 \frac{N_F}{2} > 1 \quad (14)$$

where $N_F = D_0^2/4\lambda L_F$ is the Fresnel number based on the feedback mirror distance.

Figure 9:
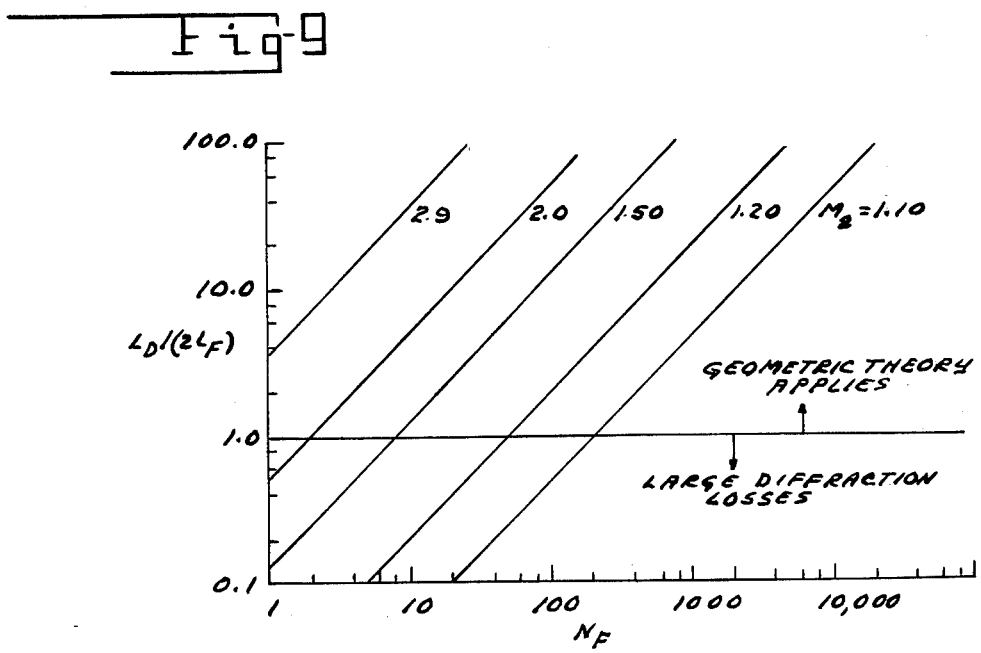
FIG. 9 is a plot showing typical variations of diffraction losses ($L_D/2L_F$) with feedback mirror fresnel number ($N_F$) for various values of plane wave magnification ($M_2$)

A plot of (14) is shown in FIG. 9. The ratio $L_D/2L_F$ is plotted versus $N_F$ for various values of the plane wave magnification $M_2$. The horizontal line ($L_D/2L_F = 1$) indicates where the geometric theory applies and where diffraction losses are expected. Thus, for the condition $L_D/2L_F < 1$, it would be expected that the reflection coefficient $r$ (see FIG. 7) calculated from the geometric analysis to be too large. It can be concluded from FIG. 9 that the diffraction losses obtained from a large-scale ($N_F$ large) device and small feedback magnification ($M_2$ small) could also be obtained from a small scale device and large feedback magnification.

A further theoretical consideration is the formation of parasitic stable cavity modes in the converging wave unstable resonator. The region between the concave mirror and the flat feedback mirror in FIG. 4 can form a stable resonator such that "bouncing ball" modes will exist in an annular region. These parasitic modes will have poor phase coherence, and high radiation flux levels will build in this region similar to a closed cavity condition. These parasitic modes have been successfully suppressed when the distance $L_F$ was increased and the mirror radius $R_1$ was decreased such that an unstable cavity was formed. A negative branch nonconfocal unstable cavity is formed if the condition $$1 - \frac{L_F + \alpha L}{R_1} < 0 \quad (15)$$

is satisfied.

A final theoretical consideration for the converging wave unstable cavity is the existence of a "hot spot" on the convex mirror in FIG. 4. The existence of a hot spot is predicted from the quasi-geometric model since the converging wave collapses down to a spot with a diameter of the order of $\sqrt{\lambda L}$ (first Fresnel zone) before expanding again to provide feedback. This hot spot could thermally load the cavity mirrors seriously at high power levels. The quasi-geometric model is too simple to predict correctly the intensity distribution of the internal cavity modes, however, and a diffraction analysis is required to determine the Fresnel number dependence. A solution to the converging wave unstable cavity problem within the Fresnel-Kirchoff scalar wave diffraction approximation has not yet been obtained. Experimental measurements have provided the information available thus far on the intensity distribution of the internal cavity modes.

A list of parameters for a typical embodiment of a converging wave confocal unstable cavity that was applied to a CW HF chemical laser is presented in Table I. This cavity was applied to an arc-driven supersonic diffusion CW HF linear flow (as opposed to a radial flow) device. A modified three-dimensional, modular, 54-slit, 1.25 cm × 18 cm nozzle array was used at flow conditions corresponding to $\simeq 2.5$kW closed-cavity power. Thus, the cavity parameters indicate a 75% reflectivity from the geometric theory for a confocal cavity magnification $M = 2.3$ and a plane wave magnification $M_2 = 1.62$.

Table I. Converging Wave Unstable Cavity Design Parameters $M = 2.3, M_1 = 1.42, M_2 = 1.62$ $L = 41$ cm, $L_F = 153$ cm $R_1 = 146$ cm, $R_2 = -64$ cm $r = 75\%, L_D/2L_F = 1.75$ $D_0 = 1.25$ cm, $N_F = 9.1$ $N = D_0^2/4\lambda L = 34$ The measurements included the output power, near-field intensity distribution, intensity distribution of the internal cavity mode on the convex mirror, internal cavity mode on the flat feedback mirror, and far-field beam quality. The cavity was conventionally prealigned with a He-Ne laser. After prealignment, the cavity resonated at an output power of $\simeq 50$ W, and fluctuations in the output indicatd near-threshold operation. The low output power was attributed to both diffraction losses and a poor matching of active medium to the annular mode. The converging wave unstable cavity differs from the conventional unstable cavity in that it sees gain averaged over an annular region. The highly nonuniform gain distribution in the linear flow device could reduce this averaged gain to near-threshold values. Thus, if one assumes an effective reflectivity $r_e = 0.5$ (assuming additional mirror absorption losses) for the converging wave cavity, a threshold gain of $\simeq 2\%$/cm is calculated. This gain is reasonable if one averages over an annular region with an i.d. of 2 cm and an o.d. of 1.25 cm. For a radial flow device, this effect would be considerably reduced since the mode and active region would be properly matched.

Figure 10:
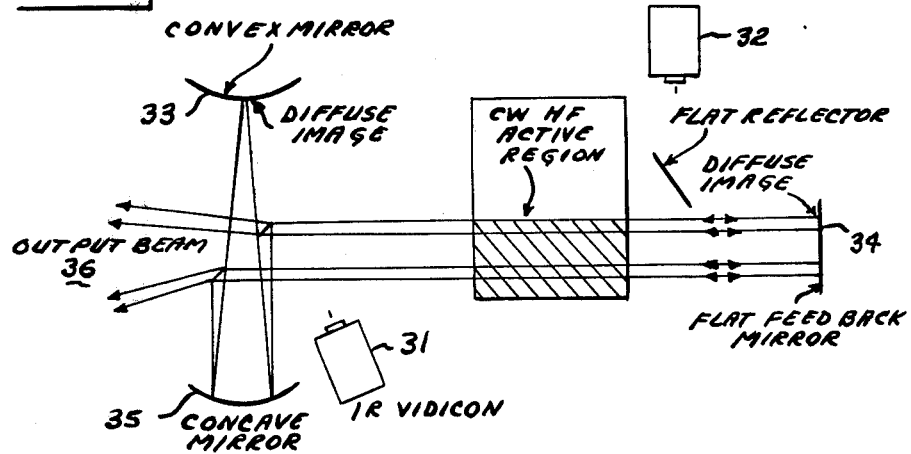
FIG. 10 illustrates schematically a typical IR vidicon technique for measuring internal cavity modes of a converging wave confocal unstable cavity.

Even though this embodiment of the device was operating near threshold, it was useful to make further diagnostic measurements on the converging wave unstable cavity modes. FIG. 10 illustrates a new technique developed for observing the internal cavity modes. IR vidicon cameras 31 and 32 recorded the diffuse infrared image of an isolated HF line [$P_2(7)$ transition] on the gold coated BeCu convex mirror 33 and the flat feedback mirror 34. These IR images had a small amount of geometric distortion caused by viewing off-axis $\simeq 15°$. While the diffuse image on the convex mirror 33 was viewed, beam quality measurements were made simultaneously in terms of the far-field power distribution. All measurements were made with a low-duty cycle internal cavity shutter to eliminate thermal distortion effects of the cavity mirrors (20-msec pulses with 1 sec between pulses). The spatial resolution of the IR vidicon measurements was $\simeq 1$ mm.

Figure 11:
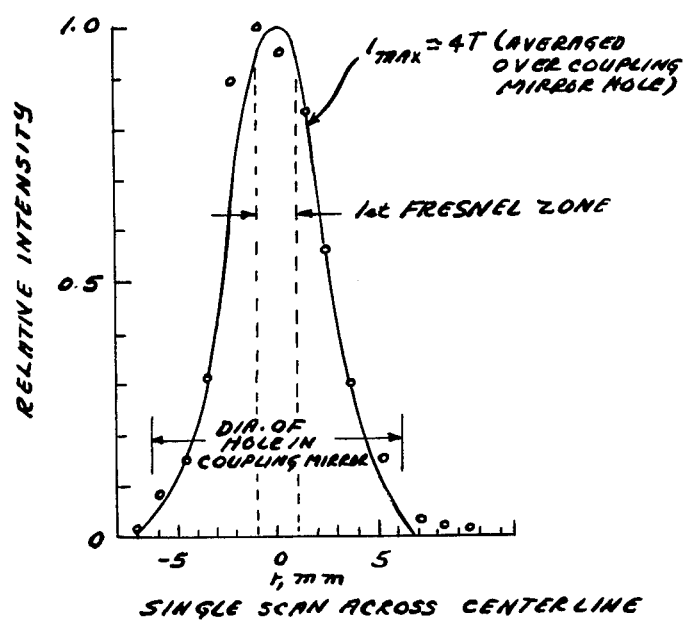
FIG. 11 illustrates graphically typical intensity distribution on convex mirror in peak intensity mode.

It was found that two dominant modes exist in the converging wave unstable cavity: a peak, on-axis, intensity distribution, hot spot mode and an annular mode. The selection of either of the two modes was found to be a very sensitive function of cavity mirror tilt; less than a 25-$\mu$rad tilt of the concave mirror 35 was sufficient to change from one mode to the other. FIG. 11 shows the intensity distribution on the convex mirror 33 from the IR vidicon data recorded during a single on-pulse corresponding to the hot spot mode. The plot shows the relative intensity versus radial position on the convex mirror scanned across the peak intensity region. The solid line correponds to a Gaussian curve fit. If an axisymmetric solution is assumed, the Gaussian fit yields a peak intensity about four times the intensity averaged over the 1.25-cm-diam hole in the 45° coupling mirror. The dotted line shows the first Fresnel zone region. Thus, the effect of diffraction for this particular resonator with an inner Fresnel number of $N = 34$ is to considerably reduce the peak intensity of the hot spot mode.

Figure 12:
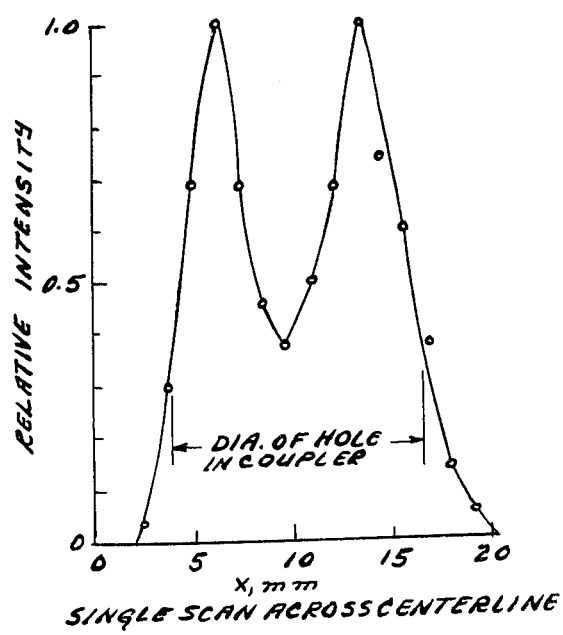
FIG. 12 illustrates graphically typical intensity distribution on convex mirror in annular mode.

FIG. 12 shows the intensity distribution on the convex mirror 33 from the IR vidicon data recorded during a single on-pulse corresponding to the annular mode. The solid line in the single centerline scan is just an approximate fit of the data. This annular mode indicates a phase change across the cavity centerline and cannot be predicted from the simple geometric model. A diffraction analysis is probably required to predict this mode pattern. It was observed that the annular mode was quite stable and would remain indefinitely once the cavity mirrors were set. The near-field intensity distribution of the diverging output beam 36 was observed, and the intensity pattern was an approximately uniform annulus for both the hot spot and annular modes.

We claim:

1. A converging wave unstable resonator for coupling coherent power from an annular gain region comprising:
   a. a confocal unstable cavity having a double-sided coupling mirror providing plane wave output and a diverging wave output;
   b. a flat, totally reflecting feedback mirror positioned external to the said cavity reflecting the said plane wave and forming an annular mode between the said feedback mirror and the said coupling mirror; and
   c. the said annular gain region positioned external the said cavity between the said coupling mirror and the said feedback mirror.

2. A converging wave unstable resonator for coupling coherent power from an annular gain region comprising:
   a. a convex spherical mirror and a concave spherical mirror positioned to form a confocal unstable cavity;
   b. a double-sided, flat, coupling mirror having an annular hole positioned substantially at 45° between the said concave mirror and the said convex mirror providing a parallel beam output from the said cavity and a diverging spherical wave output from the said cavity;
   c. a flat, totally reflecting feedback mirror positioned external the said cavity forming an annular mode with the said parallel beam between the said coupling mirror and the said feedback mirror, and
   d. the said annular gain medium positioned external the said cavity between the said coupling mirror and the said feedback mirror whereby the said resonator extracts power from the said annular gain region.

* * * * *